(12) United States Patent
Christian et al.

(10) Patent No.: US 7,677,093 B2
(45) Date of Patent: Mar. 16, 2010

(54) METHOD FOR CONTINUOUS MEASUREMENT OF DYNAMIC FLUID CONSUMPTION

(75) Inventors: Rudolf Christian, Graz (AT); Hubert Schwarzbauer, Hengsberg (AT); Michael Wiesinger, Graz (AT)

(73) Assignee: AVL List GmbH, Graz (AT)

( * ) Notice: Subject to any disclaimer, the term of this patent is extended or adjusted under 35 U.S.C. 154(b) by 124 days.

(21) Appl. No.: 11/440,362

(22) Filed: May 25, 2006

(65) Prior Publication Data

US 2006/0277982 A1 Dec. 14, 2006

(30) Foreign Application Priority Data

May 27, 2005 (AT) .............................. GM351/2005

(51) Int. Cl.
*G01M 15/00* (2006.01)
(52) U.S. Cl. .................................. 73/114.52
(58) Field of Classification Search .............. 73/114.38, 73/114.42, 114.43, 114.52, 114.53, 114.54
See application file for complete search history.

(56) References Cited

U.S. PATENT DOCUMENTS

| | | | | |
|---|---|---|---|---|
| 5,284,120 A | * | 2/1994 | Fukushima et al. | 123/510 |
| 5,708,201 A | * | 1/1998 | Kaub | 73/119 A |
| 7,231,816 B2 | * | 6/2007 | Christian et al. | 73/113 |
| 7,311,005 B2 | * | 12/2007 | Wiesinger et al. | 73/714 |
| 2004/0163459 A1 | * | 8/2004 | Christian et al. | 73/199 |
| 2004/0211263 A1 | * | 10/2004 | Wiesinger et al. | 73/716 |

FOREIGN PATENT DOCUMENTS

AT        3350 U      1/2000

OTHER PUBLICATIONS

English Abstract of AT 3350U.

* cited by examiner

*Primary Examiner*—Eric S McCall
(74) *Attorney, Agent, or Firm*—Dykema Gossett PLLC

(57) ABSTRACT

A method for continuous measurement of the dynamic fluid consumption of a consumer by use of a two-way flow sensor, particularly the measurement of gaseous or liquid fuel, and possibly a conditioning device, whereby the pressure is reduced to a constant exit pressure downstream from the flow sensor. A minimum quantity of fluid is fed through the pressure regulator at any desired time whereby fluid is continuously returned in variable quantities from the region of constant exit pressure to the region between the flow sensor and the pressure regulator to make possible a continuous, accurate and timely highly defined consumption measurement with controlled exit pressure for the fluids using an open system which is able to maintain pressures in the entire line system even at highly dynamic consumption changes and which does not allow the formation of a multiphase flow. The device for to carrying out the method is provided with a pressure control device downstream from the flow sensor and a connecting line with a pump leading from the region behind the pressure control device to the region between the flow sensor and the pressure control device.

9 Claims, 1 Drawing Sheet

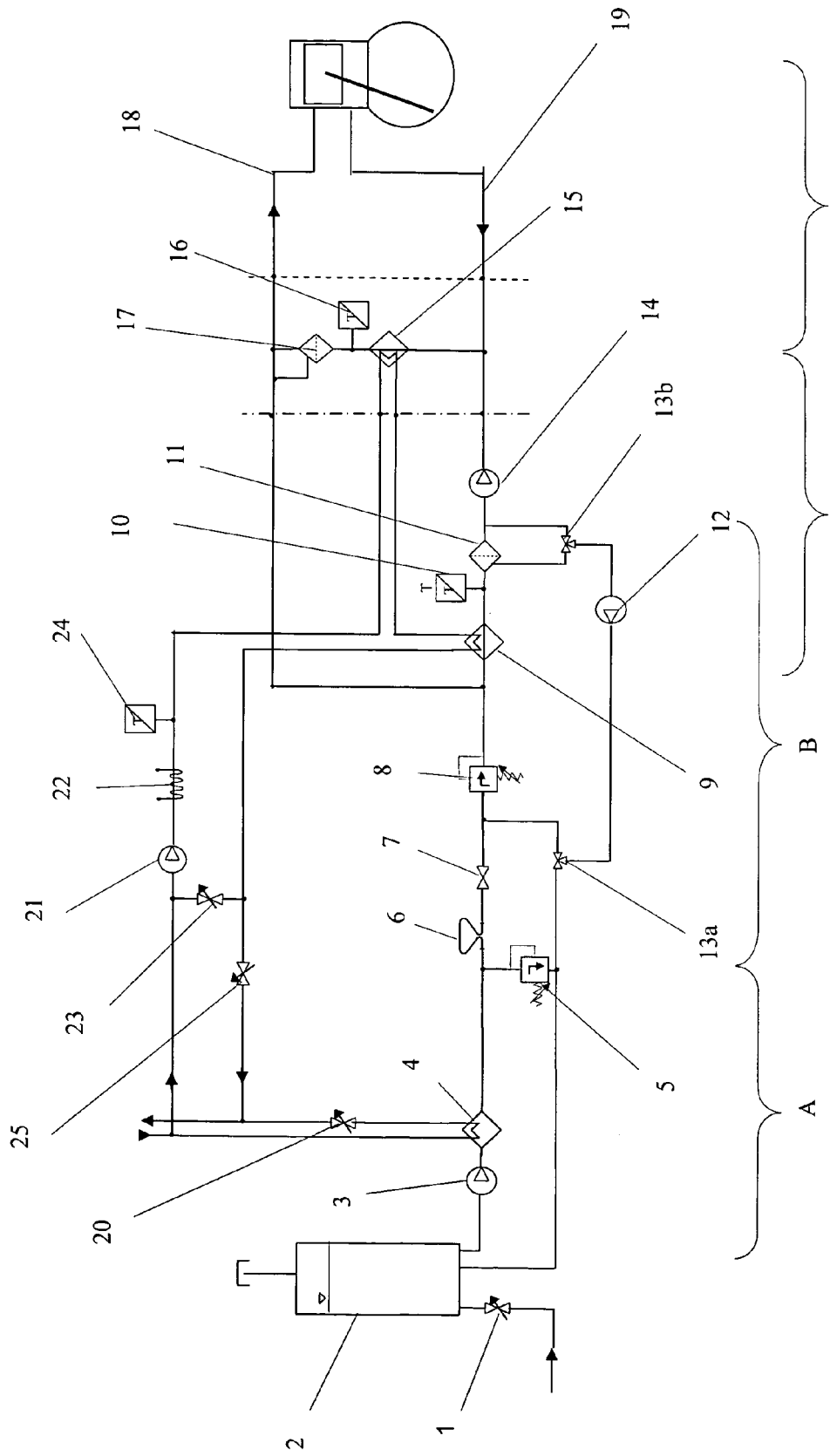

METHOD FOR CONTINUOUS MEASUREMENT OF DYNAMIC FLUID CONSUMPTION

BACKGROUND OF THE INVENTION

1. Field of the Invention

The invention relates to a method for continuous measurement of the dynamic fluid consumption of a consumer by means of a two-way flow sensor, particularly the measurement of gaseous or liquid fuel, and possibly a conditioning device, whereby the pressure is reduced to a constant exit pressure downstream from the flow sensor. The invention also relates to a device to carry out the method comprising a continuously operating flow sensor, a pressure regulator as well as a pump and possibly at least one conditioning device on the exiting side.

2. The Prior Art

Either a combination of a measuring device and a conditioning device is used for measurement of the consumption of fluids, especially in the use of measuring fuel consumption of engines on test benches—or the object is achieved through an integrated system. The object of these systems is to provide defined and reproducible conditioning of the physical fluid characteristics at the intersection to the test piece. This means, the pressure and the temperature is set at least to adjustable constant values.

Intermittently operating systems using weighing devices are known in the art for taking measurements. They have the advantage of open systems, namely the characteristic whereby fuel can be delivered from the measuring system and it can also be returned at intervals into the system limited by the feeding volume. The delivered quantity of fuel as well as the returned quantity of fuel is measured and it is included in the consumption data. Open systems are advantageous especially in modern injection systems since they push fuel back into the fuel supply system within limits—into the tank in case of a vehicle—at starting of the engine and during the pressure build-up in the injection system. Weighing devices have been shown to be of disadvantage in that they have to be refilled repeatedly and a continuous measuring operation is thereby not possible.

Measuring devices are often used for continuous measurement of fluid consumption performing volumetric measurements or for measuring the flow rate. The consumed fuel mass is thereby determined by means of an additional density measurement which then represent the actual necessary measured variable. Direct measurement of consumption of mass is currently possible by means of traditional commercial Coriolis sensors.

Attention has to be paid in taking accurate measurement during employment of these sensors that no multiphase flow occurs in any operational condition, which means, even in case of dynamic changes of the consumer. This may occur, above all, during operation using gasoline while falling below a minimum pressure locally. A greatly higher pressure is created therefore upstream from the sensor than needed directly at the intersection to the test piece.

Various methods and devices are known in the art for conditioning of the pressure. For example, a pressure stabilization device to stabilize the inlet pressure of the mass flow sensor is provided in AT-3.350 U to be able to produce the required low and constant pressure at the connection to the consumer (generally in the range of a few millibars). The flow-dependent pressure drop must therefore be variably compensated on the mass flow sensor in the use of a Coriolis sensor (by up to 2 bars, for example). In particular, high-frequency, spiking or pulse-like drawing of fluid must be quickly taken into consideration.

A pressure control device (pressure regulator) is therefore provided downstream from the actual flow sensor for pressure stabilization in the above-mentioned continuous method of fuel measurement which adjusts the flow-dependent pressure at the exit of the measuring system to a constant exit pressure. It is of a disadvantage in such a design that conventional mechanical pressure regulators act as a "hydraulic diode", whereby it is meant that flowing medium can flow only in one direction, namely downstream. A measuring system designed with such a pressure regulator does not represent an open system. Should fuel have to be returned from the injection system into the measuring system or should there occur thermal expansion of the fuel through a rise in temperature during a halt in operation by the consumer, then there is mostly created an unacceptably high pressure increase within the fuel system, depending on the elasticity of the pipe system, which stresses lines and connected devices whereby the high pressure must be caught by costly pressure compensation devices, if necessary.

AT-6303 U disclosed a solution which has the disadvantage that no open system has been created which would make a return flow through the flow sensor possible even though fuel can be returned in a limited manner, which means, the problem of pressure increase is sufficiently solved.

AT-6117 U discloses for the first time a solution which realizes an open system with continuous consumption measurement. The problem is solved through the control of pressure upstream from the sensor in a manner so that the desired exit pressure is provided downstream from the sensor. However, the exit pressure of the system is limited by the minimal entrance pressure in front of the flow sensor. Any lower pressure than that can not be adjusted. A system is also described in U.S. Pat. No. 5,284,120 A wherein a pressure sensor if arranged behind a flow sensor whereby said pressure sensor has again a controlling effect on the devices arranged in front of the flow sensor. However, a pressure reduction valve is provided between the flow sensor and the pressure sensor to lower the exit pressure for the consumer to the atmospheric pressure in a constant manner. Disclosed is again a system in which the flowing medium can flow through the regulator only in one direction, namely downstream, which means, U.S. Pat. No. 5,284,120 A does also not represent an open system. Nevertheless, a small quantity of the fluid can be taken up by a damping unit but timely cross reference between the measured consumption on the flow sensor and the actual consumption is made thereby unclear again. The disclosed arrangement is therefore not suitable for timely, highly defined and accurate measurement of fuel consumption.

The fuel temperature delivered to the test piece is of great significance aside from the constant pressure. It is legally directed for prototype tests that the temperature of the fluid must lie constant within a defined temperature interval at the intersection to the test piece. Temperature conditioning devices are used for this purpose. They are installed in the fluid circuit mostly downstream from the flow sensor. They form either an individual conditioning circuit, which is closed by means of a so-called bypass near the test piece, or said temperature conditioning devices are disposed directly in the engine circuit. In the first case, the circulating quantity of fuel in the conditioning circuit must be kept up by means of a pump. In the second case, the conditioning circuit is identical to the engine circuit and the fluid is returned mostly by the pump used in the test. The creation of an individual conditioning circuit is more advantageous since in that case stable pressure and temperature conditions can be created at the intersection to the test piece without operation of the test piece (in this case it is the bypass).

Currently commercially obtainable fuel measuring and conditioning systems are provided thereby with a measuring circuit and an inlet circuit in front of the sensor that is mostly used for venting and uncoupling of facility fuel lines. The actual measuring element of the flow sensor is disposed between these circuits. The measuring circuit consists either of an individual conditioning circuit closed by means of a bypass and the engine circuit or it consist exclusively of the engine circuit.

The stability of the mean temperature or the stored energy of the fluid maintained in the measuring circuit is of immense significance relative to the precision of measurement since each temperature change in the volume downstream from the sensor leads to so-called false flow readings under the assumption of constant geometric conditions (caused by the mostly rigid lines) and based on the thermal expansion of the fluid whereby said false flow readings appear as false readings for the entire system.

The object of the present invention was to provide a method and a device which makes possible a continuous, accurate and timely highly defined consumption measurement with controlled exit pressure for the fluids be means of an open system, which also allows at least a temporary return flow at simultaneous flow measurement, which is able even at highly dynamic consumption changes to maintain pressures in the entire line system, and which does not allow the formation of a multiphase flow.

SUMMARY OF THE INVENTION

The method in the invention is characterized for the achievement of this object in that a minimum quantity of fluid is fed through the pressure regulator at any desired time whereby fluid is continuously returned in variable quantities from the region of constant exit pressure to the region between the, flow sensor and the pressure regulator. A so-called circulation circuit about the pressure control device is established whereby said circulation circuit makes it possible that the fluid can flow back from the region of the lower exit pressure into the mostly higher pressure region downstream from the flow sensor and whereby the fluid can flow back into the system through said flow sensor. An open system is thus realized through this method for fluid flows that are smaller or equal to the set flow quantity in the circulation circuit.

According to a first embodiment of the method it is proposed that the temperature of the fluid returned through the pressure regulator and/or the fluid returned from the region of constant exit pressure to the region between the flow sensor and the pressure regulator is adjusted to a nearly constant value. Achieved is thereby the establishment of a nearly constant thermal condition within the circulation circuit through a supply or removal of energy whereby faulty measurements based on the thermal expansion of the fluid are reduced or avoided in a dynamic operation.

The fluid returned through the pressure regulator or the fluid returned from the region of constant exit pressure to the region between the flow sensor and the pressure regulator is advantageously fed through at least one heat exchanger or a conditioning device. The circulation circuit can take the place of a traditional conditioning circuit in this embodiment. In that case, not only the energy within the circulation circuit established by the lasting and possibly variably flow is eliminated but other energy gains within the circulation circuit are removed in total or partially.

The circulation circuit is closed in close vicinity of the consumer by means of a bypass, e.g. a few meters from the consumer, whereby the circulation circuit forms at the same time the conditioning circuit of the system.

In an alternative embodiment of the method, the fluid from the circulation circuit is continuously fed by means of an additional pump from the region of constant exit pressure behind the pressure control device through the so-called bypass near the test piece and returned into the circulation circuit in possibly variable quantities. This fluid flows advantageously through a heat exchanger possibly provided in the circulation circuit or a conditioning device.

In this embodiment it is proposed according to another characteristic of the invention that the pressure of the fluid, which is fed from the bypass to the consumer, is controlled in the bypass after the flow sensor independent on a constant exit pressure. The inlet pressure can thereby set independently from the return flow pressure.

Advantageous embodiments propose thereby that the fluid quantity flowing through the heat exchanger or through the conditioning device exceeds the fluid quantity fed to the consumer. It can be ensured thereby that fluid of constant temperature is fed to the test piece.

According to the invention it is additional proposed, especially for test pieces with high return quantities of more than 500 l/h, to adjust the temperature with an additional conditioning device in the section that is shared by the conditioning circuit and by the engine circuit as well as in the bypass.

In one variant it is proposed to adjust the two temperature regulators or the conditioning devices independently from one another.

The temperature of the fluid returned through the consumer is adjusted to a nearly constant value by means of an additional heat exchanger or a possible additional conditioning device. This is advantageous especially with consumers having high return quantities, e.g. higher than 500 l/h, in which an additional conditioning circuit is formed thereby.

According to an advantageous embodiment of the method, bubbles disposed in the fluid returned through the consumer are placed back into the circulation circuit by means of a separation device.

It can also be proposed that possibly appearing air bubbles are separated in the fluid circuit behind the flow sensor by means of a separation device, whereby they are subsequently collected and diverted from the fluid circuit as required.

According to another advantageous embodiment of the invention, the energy withdrawn from the consumer nearby is again added at a distance preferably downstream from the flow sensor. This characteristic allows a special economic conversion of the inventive method with preferably only one control circuit. The costs for realization of the method as well as the costs of the running operation are lower than in the independent control method of both circuits.

It is preferably proposed thereby that the inner energy is set to an essentially constant value at least in the region downstream from the flow sensor.

According to an additional characteristic of the invention, propositional functions for stability can be generated based on the added and withdrawn energy to characterize the quality of the measurement.

The aforementioned device is characterized for the achievement of the given object in that a pressure control device is provided downstream from the flow sensor and in that a connecting line with a pump is provided in the region behind the pressure control device leading to the region between the flow sensor and the pressure control device. A so-called circulation is thereby created downstream from the flow sensor in which the fluid can flow back from the region of lower exit pressure into the mostly higher pressure region after the flow sensor and then flow back further into the system lying upstream. An open system is thereby realized for fluid flows being smaller or equal to the set flow quantity in the circulation circuit.

A first advantageous embodiment of the invention proposes that a bypass line branches off from the forward flow line to the consumer and runs into the return flow line whereby the function of the conditioning circuit is achieved in the circulation circuit as well.

According to another advantageous embodiment of the device according to the invention, at least one heat exchanger, preferably a conditioning device, is inserted between the pressure control device and the pump.

It may be advantageously proposed that one or several temperature sensors are inserted between the pressure control device and the pump, preferably behind at least one heat exchanger or the conditioning device, whereby said temperature sensors are connected to a control device for at least one heat exchanger or conditioning device.

An additional design of the system in the invention is characterized in that an additional pump is inserted behind the junction of the connecting line and preferably in front of the connection of the forward flow line and the return flow line of the consumer. The temperature of the fluid fed into the test piece can be kept constant through this design even at high return quantities in the engine circuit independent from the circulation quantity.

In another embodiment it is proposed to insert an additional pressure regulator in the bypass line between the forward flow and the return flow. The forward flow pressure and the return flow pressure to the consumer can be adjusted independently through this embodiment.

According to an additional characteristic of the invention, a heat exchanger is provided in the bypass line between the forward flow and the return flow whereby said heat exchanger is preferably a conditioning device. In any case, the thermal characteristics can be maintained thereby in the engine circuit even when the return quantity of the conditioning circuit is smaller than the return quantity to the consumer. One or several temperature measuring elements are advantageously inserted into the bypass line and connected to a control device for at least one heat exchanger or the conditioning device to measure the temperature of the fluid in the circulation circuit or in the conditioning circuit, and to control the heat increase or decrease with a control device in such a manner that the thermal condition remains nearly constant.

All heat exchangers may be controlled by a common control device connected preferably with temperature sensors inserted in the bypass line to reach an economic design and an economic operation of the system.

Especially advantageous is thereby an embodiment in which the heat exchangers are connected in series, preferably through a coolant circuit, whereby preferably one or all heat exchangers provided behind the junction in the connecting line communicate with one or all heat exchangers provided in front of the junction in the connecting line. In that case, the first heat exchanger disposed in the bypass in close vicinity of the consumer is adjusted to the temperature developing therein. The heat exchanger in the circulation circuit is then biased by the coolant from said first heat exchanger. The energy generated mostly by the test piece, especially in the running operation, is used to heat the mostly cool fuel returning in the circulation circuit.

According to another advantageous embodiment, a bubble separating device is provided in front of the forward flow line of the consumer. The quality of the measurement can be evaluated if there is provided a device to monitor one or several characteristic temperatures of the fluid or of the coolant, e.g. the inlet temperature of the heat exchanger, in which a program is established to determine the stability criteria based on the monitored values. In that special embodiment of the invention it is proposed to obtain a stabilization criterion and to transfer it to a superordinate system. Plausibility statements about the quality of the fuel consumption measuring values can be advantageously derived from this criterion.

Additional flow sensors and temperature sensors may be advantageously inserted in the return flow of the consumer and they may be connected to the control device for the heat exchangers or the conditioning devices.

An additional advantageous embodiment of the inventive device is characterized in that a bubble separation device is provided between the pressure control device and the junction of the connecting line.

The bubble separation device is preferably connected to a device which collects bubbles.

It is thereby especially advantageous if a valve is provided which makes possible the removal of bubbles gathered in the device whereby these bubbles are subsequently collected.

The invention is described in more detail with the aid of an embodiment example and with reference to the accompanying drawing.

BRIEF DESCRIPTION OF THE FIGURE

The FIGURE shows the flow diagram of a device according to the invention.

DETAILED DESCRIPTION OF THE PREFERRED EMBODIMENT

An air relief tank 2 is cyclically supplied with fuel through a feeding valve 1 depending on the fuel level. Fuel is brought to a constant inlet pressure in the inlet circuit A consisting of a fuel pump 3, coolant heat exchanger 4 for the fuel and a pressure regulator 5. The air relief tank 2 has the function, on the one hand, to let bubbles escape from the fuel during the air relief operation and, above all, to pick up fuel returning from the downstream fuel circuits B, C or D in case of returning fluid. The heat exchanger 4 serves to withdraw the energy introduced into the fuel by the pump 3 with only a small amount of consumption or no consumption at all. The actual measured value and the fuel consumption is detected continuously by means of the flow sensor. The shut-off valve 7 serves to adjust the point zero of the flow sensor.

The provided circulation circuit B of the invention consists of a pressure control device 8, a coolant heat exchanger 9 for fuel, optionally a temperature sensor 10, a bubble separator 11, which serves in this case simultaneously as a filter, a fuel pump 12, and two air relief valves 13a and 13b. A minimum flow is established now through the pressure regulator 8 in the circulation circuit B during operation of the system by means of a fuel pump 12. Since fuel is now returned from the circuits C and D lying downstream, fuel can be returned via the air relief valve 13b and 13a in the pipe between the flow sensor 6 and the pressure control device 8 and the fuel can return to the inlet circuit A through the flow sensor 6.

The heat exchanger 9 in the circulation circuit B is used in the illustrated embodiment for conditioning of the fuel and to bring it to the desired forward-flow temperature, which can be detected by the temperature sensor 10. All bubbles disposed in the circuit are collected in the bubble separation device 11.

These bubbles can be moved into the air relief tank 2 through lines running parallel to the flow sensor 6 by turning the two air relief valves 13a and 13b.

The conditioning circuit C is formed by an additional fuel pump 14, an additional coolant heat exchanger 15 for fuel, a temperature sensor 16 and a bubble separation device 17, which ensure that bubbles are reliably moved from the engine circuit D back into the conditioning circuit C. The components 15, 16 and 17 forming a bypass to the engine (the consumer) are attached in the vicinity of the engine. The conditioning circuit C is closed through the heat exchanger 9 and the bubble separation device 11, which also serves the two circuits B and C, i.e., the circulation circuit and the conditioning circuit.

The engine circuit D is formed by the forward-flow line 18 of the engine, the engine and the return-flow line 19 of the engine, and by the bypass.

The water circuit consists of two parts: a first part supplying the heat exchanger 4, which is controlled by the proportional valve 20 and the second part supplying the heat exchangers 15 and 9. The water in this second part is circulated by a water circulation pump 21 and a heater 22, the two heat exchangers 15 and 9 and a valve 23. The temperature control for water temperature is adjusted by means of the heating device 22 and the outlet valve 25 depending on the temperature shown on the sensor 24.

Control and adjustment functions as well as the preparation and evaluation of the measured values are conducted in the central unit, which is not shown in the drawing.

The invention claimed is:

1. A method for continuously measuring dynamic fluid consumption of a consumer, comprising the steps of:
    (a) supplying a flow of fluid through a flow sensor so as to flow downstream in a line from the flow sensor to a consumer, said flow sensor continuously detecting an actual measured value of fluid flow and fluid consumption,
    (b) passing the fluid through a pressure regulator downstream of the flow sensor and upstream of the consumer to reduce fluid pressure to a constant pressure in the line between the pressure regulator and the consumer,
    (c) supplying part of the fluid to the consumer, and
    (d) continuously returning fluid from the flow of fluid downstream of the pressure regulator and upstream of the consumer to the flow of fluid between the flow sensor and the pressure regulator.

2. The method according to claim 1, comprising adjusting a temperature of the fluid returned in step (d) to a nearly constant value.

3. The method according to claim 1, including removing bubbles from the flow of fluid downstream of the pressure regulator.

4. The method according to claim 1, wherein the flow of fluid in step (a) derives from an air relief tank.

5. An apparatus for continuously measuring dynamic fluid consumption of a fluid consumer, comprising
    a fluid delivery line which is connected to a fluid consumer,
    a first pump for supplying fluid to said fluid delivery line so as to flow in a downstream direction to the fluid consumer,
    a flow sensor in said fluid delivery line, said flow sensor continuously detecting an actual measured value of fluid flow and fluid consumption,
    a pressure regulator in said fluid delivery line downstream of said flow sensor,
    a first return line which extends from the fluid consumer to the fluid delivery line downstream of the pressure regulator, and
    a second return line which extends from the fluid delivery line downstream of the pressure regulator to the fluid delivery line between the flow sensor and the pressure regulator, said second return line including a second pump for continuously returning fluid in variable quantities.

6. The apparatus according to claim 5, including a third pump in the fluid delivery line downstream of the pressure regulator.

7. The apparatus according to claim 5, including a bubble separating device in the fluid delivery line downstream of the pressure regulator and upstream of the first return line.

8. The apparatus according to claim 5, including a heat changer in the fluid delivery line downstream of the pressure regulator.

9. The apparatus according to claim 8, including a temperature sensor in said fluid delivery line downstream of the pressure regulator.

* * * * *